Patented Aug. 6, 1946

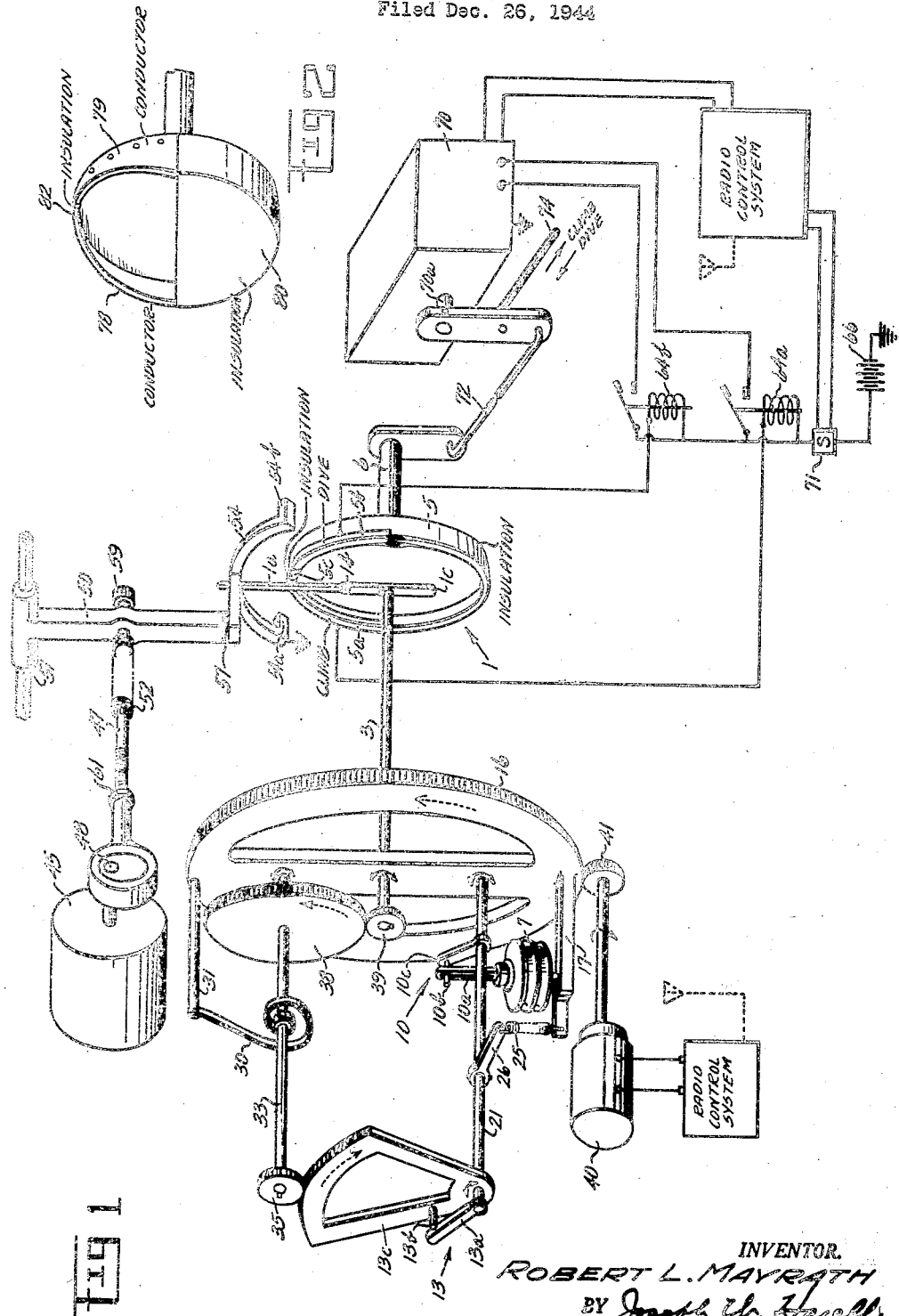

2,405,228

UNITED STATES PATENT OFFICE 2,405,228

AUTOMATIC ALTITUDE CONTROL DEVICE

Robert L. Mayrath, Dodge City, Kans.

Application December 26, 1944, Serial No. 569,869

14 Claims. (Cl. 172—282)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to altitude control devices for aircraft, and more particularly, to altitude control devices for automatically actuating aerodynamic control elements of radio controlled aircraft, responsive to changes in altitude, for the purpose of maintaining flight at a predetermined level.

Present methods of automatic altitude control in radio controlled aircraft contain a number of drawbacks, one of which is that the systems in use are complicated and expensive, which makes the cost factor considerable where such systems are installed in aircraft used for target purposes. Another drawback is found in some systems in that extreme angles of climb and dive are met. Such extreme angles sometimes cause an aircraft to stall in a down draft greater than the maximum climb rate of the aircraft, or cause the aircraft to dive to a destructive speed in a violent up draft. Various angle limiting systems have been proposed, one of which is to limit the actuation of the aerodynamic controls of the plane by limiting the extent of rotation of a trim motor adapted to actuate such elements under automatic control responsive to altitude changes. Such methods of limitation, however, are not desirable in radio controlled aircraft, since the trim motor must be capable of obtaining effects of stalling the aircraft to make landings and must also be capable of effecting diving at steep angles to perform various missions. In order to achieve these effects, other systems introduce further complications in the use of trim motors with double limits, or two trim motors, one for automatic altitude control and the other for radio control.

It is an important object of the present invention to provide a simple device for maintaining a predetermined level flight of an aircraft and wherein automatic altitude control means are incorporated comprising elements adapted to limit the extent of automatic control insofar as the rate of dive or climb are concerned.

It is a further object of the invention to provide an automatic control device having features whereby control from the ground by means of radio may be effected independently of the operation of the automatic altitude control system.

In accordance with the above objects, I provide barometric pressure responsive means comprising a lost motion linkage in combination with certain electrical elements disposed for displacement relative each other responsive to changes in altitude of an associated aircraft and wherein an electrical contact engagement occurs between an element displaced in response to barometric pressure and one or the other of a pair of contact portions of another element, depending upon whether the aircraft is rising or falling. Contact engagement of the elements is provided periodically by mechanical pressure means so that the first-named element may be constructed of light flexible material and easily displaced by the barometric pressure responsive mechanism. The contact engagement with one or the other of the contact portions serves to energize an electric motor in one direction or the other, respectively, which actuates aerodynamic control elements of the aircraft, in a well understood manner, and simultaneously displaces the contact portion carrying element in the direction of displacement of the barometric pressure responsive element to restore the initial conditions corresponding to a setting for predetermined level flight. Means are incorporated in the device whereby the displacement of the barometric pressure responsive element is limited to avoid extreme angles of climb or dive. Additional means are provided for actuating the device independently of the automatic control mechanism in order to provide a predetermined flight level by radio control, and by virtue of a lost motion linkage provided in the automatic control system, it is possible to provide independent control by radio for climbing or diving the aircraft at extreme angles under guidance of an operator when so desired.

Other objects and features of my invention will be made apparent by the detailed description which now follows with reference to the appended drawing, in which:

Fig. 1 is a perspective showing the arrangements of the elements thereof; and

Fig. 2 discloses a modification of one of the elements.

With reference to Fig. 1, the device comprises a contact arm generally indicated as 1 supported by and keyed to a shaft 3 and disposed for pivotal movement relative a contact or pick-off plate generally indicated as 5, plate 5 being keyed to a supporting shaft 6. Arm 1 is pivotally actuated by contraction or expansion of a diaphragm 7 of the type used in conventional altimeters, being responsive to barometric pressure. Diaphragm 7 is coupled to arm 1 through a bidirectional lost motion mechanism comprising a slot and pin arrangement 10 and a lever and pin arrangement 13; comprising, respectively, a slotted member 10a secured to the movable end of diaphragm 7, a pin 10b, and a lever 10c, and, a lever 13a, pin 13b and gear sector 13c. A gear 16, through which axial shaft 3 passes rotatively, serves to carry diaphragm 7 and the lost motion system by virtue of an integral beam 17 securing the relatively stationary end of diaphragm 7, and the shaft 21 rotatably supported in any suitable manner in a web of gear 16, and having keyed thereto the levers 10c and 13a and rotatably supporting gear sector 13c, it being noted that gear sector 13c is thereby provided with pivotal freedom relative shaft 21. Pin 10b is biased toward engagement with the upper end of the slot in member 10a by virtue of a spring 25 secured in tension between beam 17 and a lever 26 keyed to shaft 21. Pin 13b is biased toward engagement with lever 13a by virtue of the tendency to uncurl of a spring 30 secured between a post 31 integral with gear 16 and a shaft 33. Shaft 33 is coupled at one end by a pinion 35 to gear sector 13c and is rotatably secured at its other end, in any suitable manner, to a web of gear 16. The mechanical system thus far disclosed is completed by a gear 38 keyed to shaft 33 and engaging a pinion 39 keyed to shaft 3, whereby reversible pivotal motion of contact arm 1 is provided responsive to functioning of diaphragm 7. Means for actuating arm 1 independently of diaphragm 7 is provided in the form of an electric motor 40 having a pinion 41 engaging gear 16, motor 40 being energizable by a radio control system, in a well-known manner, as indicated on the drawing.

Attention is now invited to the pick-off system comprising arm 1 and pick-off plate 5, as heretofore described. The arm 1 comprises a metallic flexible strip or tongue 1a secured by an insulating joint 1b to a supporting member 1c keyed to the shaft 3. The pick-off plate 5 comprises a disc of hard rubber, or the like, having a peripheral ridge supporting flush with the surface thereof a pair of metallic contact segments or portions 5a and 5b. An insulating portion 5c of width greater than that of tongue 1a is provided separating contacts 5a and 5b and is arranged flush with the surfaces thereof. Tongue 1a is arranged in spaced relation to the contact portions of plate 5 by a small fraction of an inch, and is brought into periodic engagement therewith by a continuously rotating motor 45 which causes reciprocation of a rod 47 by virtue of a cam mechanism 48, in a well-known manner, thereby oscillating a bar 50, pivoted at 51, through force transmitted thereagainst by a spring 52, rod 47 being slidable in a bore provided in bar 50. Oscillation of bar 50 effects bending or deflection of tongue 1a against plate 5 by virtue of an abutting yoke member 54 having stops 54a and 54b thereon to limit pivotal motion of tongue 1a. In practice it has been found feasible to space stops 54a and b apart a distance corresponding to an altitude change of 100 feet. Yoke 54 is secured through an insulating member 57 to bar 50. A periodic engagement between tongue 1a and pick-off plate 5 of 200 times per minute has been found suitable for practical operation. Rod 47 is provided with an end abutment 59 and spring 52 is sufficiently strong to hold bar 50 against abutment 59 until tongue 1a has been pressed firmly against pick-off plate 5 at some point on the surfaces 5a, 5b or 5c. The stroke of bar 50 is such that periodically yoke 54 will clear tongue 1a to allow freedom for pivotal movement thereof responsive to functioning of diaphragm 7. During the momentary clamping action of tongue 1a against plate 5, no angular displacement of the tongue 1a is intended to occur even though diaphragm 7 may be expanding or contracting at the time, since the lost motion provided between pin 10b and the slot in member 10a will permit diaphragm 7 to expand without forcing angular displacement of arm 1 clockwise, and the lost motion provided between lever 13a and pin 13b will permit diaphragm 7 to contract without forcing angular displacement of arm 1 counterclockwise. The bidirectional lost motion structure is an important feature of the device for the above reason, and for other reasons which will be understood from the description of the manner in which the device operates hereinafter set forth. If it is desired, any suitable length adjusting means 61 may be provided on rod 47 to provide variation of the time of engagement between tongue 1a and pick-off plate 5. An electrical ground connection, as indicated on the drawing, is provided for yoke 54 and contacts 5a and 5b are electrically connected through relays 64a and b, respectively, and thence through battery 66 to ground so that a series connection is established at such times as tongue 1a engages contact 5a or 5b, thereby energizing the correspondingly lettered relay to close a circuit energizing a motor 70. Motor 70 is a reversible type and will be understood to include a reduction gear system having an output shaft 70a connected in such a manner that the direction of rotation is dependent on whether relay 64a or 64b has been energized subsequent to contact of tongue 1a with contact 5a or 5b. A linkage system, generally indicated by 72, couples the shaft of motor 70 to shaft 6, and a linkage system, generally indicated by 74, couples the shaft of motor 70 to the controls of an associated aircraft, e. g., the throttle lever, pitch control mechanism, or gyro base line. Motor 70 is independently controllable by a radio control system indicated on the drawing, which, of course, may be the same radio control system indicated in conjunction with the motor 40. A radio controlled switch is provided at 71 in the circuit of battery 66 for cutting out the automatic control system at such times as motor 70 is independently operated, the switch at 71 being cut in by radio control when resuming automatic operation.

In operation, assuming the device is installed on a grounded aircraft and motor 45 is rotating, tongue 1a is so positioned relative pick-off plate 5 that periodic engagement with insulating surface 5c is established. This is regarded as normal periodic engagement, motor 70 being deenergized since the surface 5c is a nonoperative point insofar as energization of relays 64a and 64b are concerned. At such time, tongue 1a is midway between stops 54a and 54b and pin 10b is in abutment with the top of the slot in member 10a, while lever 13a is in abutment with pin 13b. The device may then be set for predetermined flight level by energization of motor 40, through the radio control system or by direct control, whereby gear 16 is rotated counterclockwise by pinion 41, the entire mechanism 7–39 rotating bodily with gear 16, including shaft 3 and arm 1. After gear 16 is rotated approximately 30° tongue 1a abuts stop 54a. Continued rotation of gear 16 then serves to wind up spring 30 secured to shaft 33 due to a counterclockwise rotation of gear 38 caused by reaction against the now stationary pinion 39, and simultaneously gear sector 13c is rotated clockwise due to engagement with pinion 35, which rotates with gear 38. The dashed arrows on the drawing indicate the relative rotation of the gear train as just described. Rotation of gear sector 13c displaces pin 13b away from lever 13a, thus providing a lost motion gap therebetween. The extent of the lost motion gap determines the height at which the aircraft will level off in flight, and is determined in any suitable manner, such as by timing the duration of energization of motor 40, in relation to a known maximum extent of gap corresponding to the flight ceiling of the particular aircraft. Simultaneously with the foregoing functioning of the mechanism 7–39, periodic engagement between tongue 1a and contact 5a is occurring, whereby motor 70 is correspondingly periodically energized by operation of relay 64a, shaft 70a rotating in a counterclockwise direction, thereby setting the control elements of the aircraft for climb, by actuation of linkage 74, and simultaneously linkage 72 rotates pick-off plate 5 to restore the condition of normal periodic engagement, i. e., plate 5 follows arm 1 counterclockwise at a rate determined by the R. P. M. of the reduction gear output shaft of motor 70. Ultimately the insulated surface 5c arrives in position to be periodically engaged by tongue 1a which is in its limit position in abutment against stop 54a, thereby breaking the circuit to relay 64a and deenergizing motor 70. Motor 40, however, runs pursuant to operator control and may be stopped either before or after the insulating surface 5c has rotated into register with arm 1, the point of stopping of motor 40 being dependent only on the selected flight level.

It will be appreciated that the rate of climb is determined by the arc of travel of arm 1 prior to abutting the stop 54a, since motor 70 which sets the controls is energized only for the length of time required to effect the followup rotation of plate 5. The followup arc is, of course, identical substantially with the travel arc of arm 1, and accordingly limited as a design matter by the arcuate spacing of stop 54a (or 54b in the reverse direction) from the center of yoke 54. It will be further appreciated that the width of insulating surface 54c relative the width of tongue 1a determines the extent to which the arm travel arc and the plate followup arc are identical, such relative width being likewise a matter of design which may be varied to suit desired operation, such width likewise determining the extent of altitude variation operationally encountered prior to initiation of corrective response.

The flight level having been predetermined, assuming the aircraft now takes off, it rises by virtue of the setting of the control elements for climb, as just described. The aircraft continues to rise until diaphragm 7 expands sufficiently to permit rotation of lever 10c, lever 26 and shaft 21 (in a clockwise direction) by virtue of the biasing action of spring 25, to a degree sufficient to close the gap between lever 13a and pin 13b.

At this time the aircraft has arrived at the predetermined flight level but is continuing to rise since the aircraft control elements are still set for climb, whereupon diaphragm 7 expands further, thus permitting lever 13a to drive gear sector 13c clockwise due to the biasing influence of spring 25, this motion being transmitted through pinion 35, shaft 33, gear 38, pinion 39, shaft 3 to arm 1, causing clockwise rotation thereof away from stop 54a. The rotation of arm 1 serves to remove the point of periodic engagement from the insulating surface 5c to some point on the contact 5b, the extent of arcuate travel of arm 1 depending upon the altitude deviation encountered. Relay 64b is thus energized and motor 70 responds accordingly, operating the aircraft control elements to effect diving of the aircraft. Simultaneously, plate 5 is rotated clockwise to followup arm 1, which in turn, is now being affected by contraction of diaphragm 7 through the mechanism 7—39 responsive to the present diving of the aircraft so that the rotational direction is reversed, i. e., arm 1 starts moving towards surface 5c while surface 5c is still moving clockwise to follow up the original displacement of arm 1, since tongue 1a is still in periodic engagement with surface 5b. The rate of restoration of normal periodic engagement between tongue 1a and surface 5c is thus increased, the relative angular velocities of arm 1 and plate 5 being dependent on the sensitivity of system 7—39, speed of motor 70 and rate of dive, in general. Ultimately, normal periodic engagement is restored as a result of the action just described, and if at the time of restoration lever 13a just abuts pin 13b, the aircraft is operating at the predetermined flight level. If, however, due to conditions of design and/or the existing air currents the aircraft has dived below the predetermined level in the action just described, then diaphragm 7 contracts and causes counterclockwise rotation of arm 1, whereby periodic engagement with surface 5a is resumed at some point corresponding to a materially lessened travel arc of arm 1, as compared with the prior engagement therewith, and once more the aircraft climbs. The hunting action thus continues, each reversal having a materially lessened arc of arm 1 until equilibrium is obtained, i. e., lever 13a just abuts pin 13b but transmits no torque to gear sector 13c and arm 1 is positioned substantially midway between stops 54a and 54b, the tongue 1a periodically engaging surface 5c, which is the initial condition of all these elements prior to predetermination of the flight level.

If, for any reason, the aircraft should lose altitude from the predetermined level, diaphragm 7 will contract, thereby actuating the lever 13a counterclockwise, and thus permitting spring 30 to uncurl, the ensuing rotation of shaft 33 driving gear 38 clockwise whence pinion 39, shaft 3 and arm 1 are rotated counterclockwise. Tongue 1a is accordingly brought into periodic engagement with the surface 5a, the arc of travel of tongue 1a being proportional to the rate at which the aircraft is losing altitude as compared with the mechanical inertia of the system 1—39, and relay 64a is energized whence motor 70 actuates the control elements in the direction of climb. Likewise, if for any reason the aircraft should gain altitude, diaphragm 7 will expand, permitting clockwise rotation of lever 13a under the influence of spring 25, whence the gear train 13c—39 causes clockwise rotation of arm 1, whereby engagement of tongue 1a with surface 5b produces diving actuation of the aircraft control surfaces. In either case, the followup operation of plate 5 is responsive to angular displacement of arm 1 and in the same direction. It will be appreciated that stops 54a and 54b limit the rotary displacement of arm 1 and therefore limit the angle of climb or dive of the aircraft to avoid unreasonable values which might cause stalling or destructive diving speeds.

With the aircraft in level flight at some predetermined altitude, it is possible to change the altitude to some other predetermined level by remote radio control of motor 40, the action of the device for predetermining a higher level being the same as that described for preflight predetermination. This follows from the fact that the relative positions of lever 13a, pin 13b, arm 1, plate 5 and yoke 54 are restored after the aircraft has found the originally predetermined level, as noted above.

In order to predetermine a level lower than that at which the aircraft is flying, motor 40 is controlled by radio to rotate counterclockwise, whence the system 1—39 rotates bodily clockwise until tongue 1a abuts stop 54b, thus locking pinion 39 against clockwise rotation. Further rotation of motor 40 serves to rotate gear 16, gear 38, shaft 33, and pinion 35 clockwise, causing gear sector 13c, pin 13b, lever 13a, shaft 21 and lever 10c to rotate counterclockwise, whence pin 10b rides downwardly in the slot in member 10a. Tongue 1a having been brought into periodic engagement with surface 5b, the electrical control system becomes operative to dive the aircraft. The duration of dive depends on the extent of lost motion provided between pin 10b and the upper end of the coacting slot, which in turn is dependent on the duration of energization of motor 40, the controllable factor. The dive is continued until diaphragm 7 has contracted sufficiently to translate member 10a downwardly so that pin 10b abuts the upper end of the slot. Functioning of pick-off plate 5 to followup arm 1 has been occurring from the time of energization of motor 70, equilibrium condition being restored after some hunting, due to the aircraft diving beyond the newly predetermined level. Accordingly, with the aircraft in flight, any number of flight levels may be successively predetermined as desired, by radio control of motor 40, due regard being had for the direction of rotation thereof, depending on whether a flight level is desired higher or lower than the existing flight level.

In the event that it is desired to stall the aircraft or to produce a fast or deep dive, motor 70 is remotely controlled by radio to operate the aircraft control elements independently of the system 1—64b, power from battery 66 being obtained therefor in any suitable manner, such as by providing a multiple switch at 71, which automatically disconnects battery 66 from the system 1—64b and connects it to motor 70 in a controllably reversible manner. The details of the radio system and switching arrangement form no part of the present invention and are accordingly indicated only generally on the drawing. By independent operation of motor 70 the aircraft may be brought into extreme stall or dive angles at the will of the operator, and altitude change in either direction, although causing a contraction or expansion of diaphragm 7, does not actuate the system 1—54b to the point of damage since arm 1 comes to rest against either stop 54a or 54b and contraction or expansion of diaphragm 7 thereafter serves, respectively, to rotate lever 13a away from pin 13b or translate member 10a relative pin 10b in an upward direction, as seen from the drawing, whereby pin 10b rides harmlessly in the slot in member 10a.

In Fig. 2 is disclosed a modification of the pick-off plate 5 of Fig. 1, wherein the contact portions 78 and 79 differ from contacts 5a and 5b of plate 5 in that they are sloped, being gradiently spaced from the plane of insulating material 80 toward the intermediate insulating portion 82. The sloping construction provides a decreased time of energization of the aircraft control motor, i. e., motor 70, (Fig. 1) would not be energized as much during the complete followup of the pick-off plate shown in Fig. 2 were this plate substituted for the plate 5 of Fig. 1. This follows from consideration of the coaction between tongue 1a and either of the sloping surfaces 78 and 79. Where coaction of tongue 1a is provided with a surface uniformly receding from engagement due to a followup rotation, as is the case of a plate formed as shown in Fig. 2, the duration of each engagement will progressively diminish from the beginning to the end of a followup rotation since progressively more time is used in nonengaging deflection during each deflection cycle of tongue 1a. Accordingly, motor 70 receives energy impulses of progressively diminishing duration and the aircraft control elements are operated correspondingly. Such a feature is useful in high speed aircraft where response to the aircraft control elements may be disproportionately large as compared with the rate of operation of the automatic altitude control mechanism. By providing a pick-off plate shaped as in Fig. 2, the response of the aircraft will be made to progressively decrease, thereby attaining the advantage of a relatively large and prompt initial response combined with a gradual tapering off in rate of response so as to make the overall altitude change proportional to the extent of altitude deviation affecting the automatic mechanism rather than to the speed of the aircraft.

Having thus described my invention, I claim:

1. In a device as set forth in claim 12, wherein said altitude response means comprises a gear axially aligned with said contact arm, a pressure responsive diaphragm carried by said gear, a pinion coaxial with said gear and secured for rotation with said contact arm, a driver for said pinion mounted for rotation on said gear, and linkage means connecting said diaphragm with said driver whereby pulsating of said diaphragm responsive to altitude deviations of said associated aircraft is operative to rotate said contact arm in a direction depending on the direction of pulsation of said diaphragm, and means operatively connected to said gear and operable independently of said diaphragm to rotate said gear for the purpose of displacing said contact arm by torque acting on said pinion, and transmitted through said gear, said linkage system and said driver, to predetermine flight level of said associated aircraft.

2. In a device as set forth in claim 12 wherein said means for causing periodic engagement of said arm with said contact member comprises an oscillating member disposed for periodic abutment against said arm in such a manner as to cause flexure thereof against said contact member, said oscillating member carrying stop means thereon whereby displacement of said contact arm responsive to altitude changes of said associated aircraft is limited in response thereto.

3. In a device as set forth in claim 12, wherein said altitude response means comprises diaphragm means responsive to barometric pressure, bidirectional lost motion linkage means connecting said diaphragm means to said contact arm whereby reversible angular displacement thereof corresponding to expansion or contraction of said diaphragm means is realized, said means for causing periodic engagement comprising an oscillating member adapted to abut said contact arm in such a manner as to cause flexure thereof against said contact member, said oscillating member comprising stop means adapted to limit angular displacement of said contact arm in either direction, whereby lost motion in said lost motion linkage means is operative to prevent bending strain on said contact arm when said contact arm has traveled to one or the other limits of its angular displacement.

4. In a device as set forth in claim 12, comprising means for rotatably mounting said contact member, electrical relay means connected to said contact portions and operative to energize an electric motor in one direction of rotation or the other dependent on periodic engagement of said contact arm with one or the other of said contact portions, means actuated upon energization of said motor for operating ascent or descent controls of said associated aircraft dependent on the direction of rotation of said motor, and means operatively connected to said contact member and actuated by said motor for simultaneously rotating said contact member in the same direction as the direction of displacement of said contact arm.

5. An automatic altitude control device, comprising a contact arm and a contact plate, said arm being engageable with said plate, said plate having a nonoperative point for engagement with said arm and an operative point for engagement therewith, said arm being adapted normally for engagement with said non operative point, means including a barometric pressure responsive element for displacing said arm relative said plate to effect engagement of said arm with said operative point in response to an altitude change of an associated aircraft, means operative in response to engagement of said arm with said operative point to actuate controls of said aircraft for effecting an altitude change, and means operative in response to actuation of said last-named means to effect displacement of said plate to restore said normal engagement.

6. In a device as set forth in claim 5, including a second operative point on said plate, said nonoperative point being disposed intermediate said operative points, said means for displacing said arm in response to altitude change being operative to effect said displacement reversibly corresponding to gain or loss of altitude, said plate being correspondingly reversibly displaceable to restore said normal engagement.

7. In a device as set forth in claim 5, including means connecting said arm and said barometric pressure responsive element comprising a lost motion linkage, and means for effecting displacement of said arm for engagement with said operative point independently of altitude changes, for predetermining a flight level deviating from the existing level of said aircraft, means for causing a degree of lost motion in said lost motion linkage subsequent to independent displacement of said arm to a limited extent, whereby said barometric pressure element is mechanically unaffected by said independent displacement of said arm, said altitude response element being operative to take up said lost motion proportionally as said aircraft approaches said predetermined level, the degree of lost motion being proportional to the altitude difference between the predetermined flight level and the existing flight level.

8. An automatic altitude control device, comprising a contact arm and a contact plate, said arm being engageable with said plate, said plate having a nonoperative point intermediate a pair of operative points, said arm being adapted normally for engagement with said nonoperative point at an existing flight level, means including a barometric pressure responsive element for displacing said arm relative said plate to effect engagement of said arm with one of said operative points dependent on a gain or loss of altitude of an associated aircraft, means operative in response to engagement of said arm with said operative point to actuate controls of said aircraft for effecting a compensating altitude change, means operative in response to actuation of said last-named means to effect displacement of said plate to restore said normal engagement, means connecting said arm and said barometric pressure responsive element comprising a bidirectional lost motion linkage means, and means for effecting reversible displacement of said arm for engagement with one or the other of said operative points independently of altitude changes, for predetermining a flight level higher or lower than the existing flight level, means for causing a degree of lost motion in said bidirectional lost motion linkage means, alternatively, depending on the direction of independent displacement of said arm subsequent to displacement thereof in either direction to a limited extent, whereby said barometric pressure responsive element is mechanically unaffected by said independent displacement of said arm, said altitude response element being operative to take up said lost motion proportionally as said aircraft approaches said predetermined level, the degree of lost motion being proportional to the altitude difference between the predetermined flight level and the existing flight level.

9. An aircraft control device comprising, in combination, a pair of contact elements, means for causing engagement of said elements, engagement thereof normally occurring at a nonoperative point therebetween, means whereby said elements are displaceable relative each other, relative displacement between said elements being effective to shift the point of engagement to an operative point therebetween, means responsive to engagement at said operative point effective to actuate control means of said aircraft, and means responsive to actuation of said control means to provide an opposite relative displacement between said elements whereby engagement at said inoperative point is restored.

10. In a device as set forth in claim 9, wherein said means whereby said elements are displaceable relative each other includes an altitude responsive element and lost motion linkage means connecting said altitude responsive element to one of said contact elements for displacement thereof responsive to altitude changes, stop means for limiting displacement of said contact element, whereby, when said contact element is at the limit of displacement thus provided, further altitude change is operative to effect lost motion compensation in said lost motion linkage means to relieve additional displacing force on said contact element and whereby the extent of actuation of said aircraft control means is correspondingly limited.

11. In a device as set forth in claim 12, wherein said plate comprises a pair of contact members having surfaces which slope in relation to the plane of displacement thereof, whereby periodic engagement with said arm occurs with progressively varying duration of contact as said plate is displaced relative said arm.

12. In an automatic altitude control device, a contact arm, a contact member having a pair of elongated contact portions separated by an insulated portion, said contact arm being normally positioned to engage said insulated portion only, altitude sensitive means responsive to changes in altitude of an associate aircraft whereby said arm is displaceable away from said insulated portion and along one or the other of said elongated contact portions, means for periodically causing engagement of said contact arm with said contact member, normally against the insulated portion but displacement of said arm along said elongated contact portions in response to altitude changes being operative to change the point of periodic engagement of said arm with said contact member to one of the contact portions thereof, means responsive to contact between said arm and one of said contact portions to vary the controls of said associate aircraft to provide ascent or descent depending on the specific contact portion engaged, and means responsive to periodic engagement of said arm with said specific contact portion to displace said contact member in the direction of the displacement to restore said normal periodic engagement.

13. In a device for bringing an associated aircraft to a preselected altitude and maintaining it at said altitude, a control motor operable from a neutral position in one or the other directions to set the controls of the associate aircraft for climb or dive, a first electric switch element carrying two elongated insulated contacts with an insulating space therebetween, one electrically connected to each motor terminal and arranged to convey current to revolve said motor in one or the other direction, linkage connecting said control motor to said first electric switch element for moving said elognated contacts in coincidence with movement of said controls, a second electric switch element comprising a single contact for conveying current to one or the other of said elongated contacts, normally situated in said insulating space and out of contact with said elongated insulating contacts but movable along said elongated contacts in either direction, independently of the movement of said first electric switch element, means to selectively set said second electric switch element in one or the other direction along one or the other of said elongated insulated contacts, whereby said control motor operates said controls for climb or dive and coincidentally moves said insulating space to a position in alignment with said single contact, an altitude sensitive means, and linkage connecting said altitude sensitive means to said second electric switch element operative by movement of said altitude sensitive means upon change in altitude of said associated aircraft to return said single contact to the starting position, whereby said control motor returns to the neutral position for maintaining the selected altitude.

14. The device defined in claim 13 in which the first electric switch element is a rotatable dielectric disc, the elongated insulated contacts being arcuate metal pieces carried in said disc, and the second electric switch element is an independently rotatable conductive contact arm adapted for contact with said arcuate metal pieces.

ROBERT L. MAYRATH.